United States Patent
Liu et al.

(10) Patent No.: US 7,903,638 B2
(45) Date of Patent: Mar. 8, 2011

(54) COMMUNICATION LINK BONDING APPARATUS AND METHODS

(75) Inventors: Bo Liu, Kanata (CA); Frank Jurgen Gilbert Devolder, Bonheiden (BE); Paul Marie Pierre Spruyt, Heverlee (BE); Charles Michael Storry, Kemptville (CA); Michael Edward Smelters, Kanata (CA)

(73) Assignee: Alcatel Lucent, Paris (FR)

( * ) Notice: Subject to any disclaimer, the term of this patent is extended or adjusted under 35 U.S.C. 154(b) by 831 days.

(21) Appl. No.: 11/102,308

(22) Filed: Apr. 8, 2005

(65) Prior Publication Data

US 2006/0176900 A1   Aug. 10, 2006

Related U.S. Application Data

(60) Provisional application No. 60/651,255, filed on Feb. 9, 2005.

(51) Int. Cl.
  *H04L 12/66* (2006.01)
  *H04L 12/28* (2006.01)
  *H04L 12/40* (2006.01)
  *H04J 3/16* (2006.01)

(52) U.S. Cl. .......... 370/352; 370/389; 370/438; 370/465

(58) Field of Classification Search .................. 370/465, 370/389, 352, 438
See application file for complete search history.

(56) References Cited

U.S. PATENT DOCUMENTS

| | | | |
|---|---|---|---|
| 6,222,837 B1 * | 4/2001 | Ahuja et al. .................. | 370/352 |
| 6,480,494 B1 * | 11/2002 | Hawley .................... | 370/395.61 |
| 6,665,733 B1 * | 12/2003 | Witkowski et al. ........... | 709/249 |
| 7,006,500 B1 * | 2/2006 | Pedersen et al. ............. | 370/394 |

(Continued)

FOREIGN PATENT DOCUMENTS

EP   0 905 997 A   3/1999

(Continued)

OTHER PUBLICATIONS

IEEE Draft P802.3ah/D3.1, "Draft Amendment to-Information Technology-Telecommunications and information exchange between systems—Local and metropolitan area networks—Specific requirements-Part 3: Carrier sense multiple access with collosion detection (CSMA/CD) access method and physical layer specifications-Media Access Control Parameters, Physical Layers and Management Parameters for subscriber access networks", 2004, the Institute of Electrical and Electronics Engineers, Inc.

(Continued)

*Primary Examiner* — Daniel J Ryman
*Assistant Examiner* — John Blanton
(74) *Attorney, Agent, or Firm* — Kramer & Amado, P.C.

(57) ABSTRACT

Communication link bonding apparatus and methods are disclosed. Multiple communication links are configured, at a communication link termination module which transfers communication traffic between a further communication link and the multiple communication links, as a group for providing an aggregate group communication traffic rate. The aggregate group communication traffic rate is allocated among the grouped communication links, and communication traffic is distributed for transmission on the communication links in accordance with the communication traffic rate allocation. Once communication links of a group have been initialized using respective initialization communication traffic rates, a communication traffic rate allocation for each of the communication links may be calculated based on an attainable communication traffic rate of the communication link.

17 Claims, 3 Drawing Sheets

U.S. PATENT DOCUMENTS

| | | | |
|---|---|---|---|
| 7,035,214 B1* | 4/2006 | Seddigh et al. | 370/231 |
| 7,406,042 B1* | 7/2008 | Shridhar et al. | 370/230 |
| 2005/0276263 A1* | 12/2005 | Suetsugu et al. | 370/389 |
| 2006/0023756 A1* | 2/2006 | Meier | 370/537 |
| 2006/0039366 A1* | 2/2006 | Ghosh et al. | 370/360 |
| 2009/0070454 A1* | 3/2009 | McKinnon et al. | 709/224 |

FOREIGN PATENT DOCUMENTS

| | | |
|---|---|---|
| EP | 0 910 195 A | 4/1999 |
| WO | WO 03/067834 A | 8/2003 |

OTHER PUBLICATIONS

International Telecommuncation Union, ITU-T G.998.2, "Series G: Transmission Systems and Media, Digital Systems and Networks, Digital sections and digital line system-Access networks; Ethernet-based Multi-Pair Bonding", Jan. 2005.

International Telecommuncation Union, ITU-T G.998.1, "Series G: Transmission Systems and Media, Digital Systems and Networks, Digital sections and digital line system-Access networks; ATM-based Multi-Pair Bonding", Jan. 2005.

Committee T1-Telecommunications, Working Group T1E1.4, San Diego, CA, Dec. 8-11, 2003, "Draft proposed American National Standard, ATM-based multi-pair bonding," Project: T1E1-43: M2DSL.

* cited by examiner

COMMUNICATION LINK BONDING APPARATUS AND METHODS

CROSS-REFERENCE TO RELATED APPLICATION

This application claims the benefit of U.S. Provisional Patent Application Ser. No. 60/651,255 entitled "COMMUNICATION LINK BONDING APPARATUS AND METHODS", filed on Feb. 9, 2005. The entire contents of this provisional application, including the specification and drawings thereof, are hereby incorporated by reference into the present application.

FIELD OF THE INVENTION

This invention relates generally to communications and, in particular, to bonding communication links such as Digital Subscriber Line (DSL) connections.

BACKGROUND

Generally, communication links can provide limited bandwidth or communication rates. For certain types of communication link, including DSL connections for instance, distance and bandwidth are inversely proportional. As the length of a DSL loop line increases, the bandwidth of the loop decreases. DSL services thus tend to be limited in terms of reach, bandwidth, or both.

Communication link bonding, in which multiple communication links are configured as a group, addresses bandwidth or communication traffic rate constraints by allowing communication traffic to be transferred on more than one communication link. Each communication link in a bonding group provides a portion of an aggregate group communication traffic rate. Bonding thereby allows higher communication traffic rates to be maintained over longer distances relative to single-link implementations.

ITU Recommendation G.998.1 describes many aspects of bonding DSL lines based on Asynchronous Transfer Mode (ATM), and represents one example of a communication link bonding technique. However, this ITU Recommendation is silent regarding an architectural approach to bonding individual DSL lines, or any other types of communication link, into a group. This ITU Recommendation also fails to provide recommendations for optimizing an allocation of communication traffic rates to bonded communication links.

There remains a need for communication link bonding schemes with enhanced flexibility, to bond communication links provided by multiple communication chipsets in some communication equipment architectures, for example. A need also remains for improved techniques to allocate an aggregate group communication traffic rate among communication links in a bonding group. Communication link bonding techniques which are relatively easily implemented and have limited impact on processing resources and existing functions and applications may be particularly desirable.

SUMMARY OF THE INVENTION

Embodiments of the invention provide a de-centralized architecture for bonding communication links, illustratively ATM-based bonding of DSL lines such as Asymmetric DSL (ADSL), Very high speed DSL (VDSL), or more generally any DSL (xDSL) lines. Communication links are logically bonded into a group to increase access bandwidth to a given Customer Premises Equipment (CPE) terminal, for instance. In one embodiment, multiple local loop pairs are bonded so as to increase a subscriber's DSL bandwidth.

Communication equipment such as a DSL Access Multiplexer (DSLAM) which includes a communication network termination, line terminations, and transceivers connected to communication lines, for example, may benefit from bonding communication lines at the line terminations instead of at the transceivers. This type of bonding mechanism addresses specific implementation aspects of communication line bonding which are missing from the above ITU Recommendation, to provide a bonding function which is local to each line termination.

According to one aspect of the invention, there is provided an apparatus for managing transfer of communication traffic over communication links. The apparatus includes a communication link bonding manager and a bonding module. The communication link bonding manager is adapted to configure multiple communication links, at a communication link termination module which transfers communication traffic between a further communication link and the multiple communication links, as a group for providing an aggregate group communication traffic rate on the further communication link, and to allocate the aggregate group communication traffic rate among the multiple communication links. The bonding module is adapted to distribute communication traffic received on the further communication link for transmission on the multiple communication links in accordance with the communication traffic rate allocation. Either or both of the communication link bonding manager and the bonding module may be implemented in software for execution by a processor.

In one embodiment, the communication link bonding manager allocates the aggregate group communication traffic rate by determining respective attainable communication traffic rates of the communication links and calculates a communication traffic rate allocation for each link based on its attainable communication traffic rate.

The bonding module may distribute the communication traffic in a sequence of transmission data units for transmission on the communication links, and may be further adapted to include in each of the transmission data units a sequence identifier indicating a position of the transmission data unit in the sequence of transmission data units.

The bonding module may also receive communication traffic from the communication links in transmission data units comprising respective sequence identifiers indicating a sequence of the transmission data units, and merge the received transmission data units in the sequence indicated by the sequence identifiers into an aggregate communication traffic stream for transfer to the communication link termination module. Merging of the received transmission data units may involve determining expected sequence identifiers, storing transmission data units having the expected sequence identifiers received within a predetermined period of time, and declaring as missing any transmission data units having expected sequence identifiers which are not received within the predetermined period of time.

The communication link bonding manager may configure the group by storing information in a Management Information Base (MIB) responsive to received user inputs. In particular example embodiments of the invention, the MIB includes a communication link mode parameter indicating whether a communication link is eligible to be included in the group, a rate split mode parameter indicating whether allocation of the aggregate group communication rate is to be performed by the bonding manager automatically or responsive to user inputs, or both.

In accordance with another aspect of the invention, an apparatus for allocating communication traffic rates to communication links configured as a group for providing an aggregate group communication traffic rate includes a communication link bonding manager which is adapted to initialize the communication links using respective initialization communication traffic rates, and to calculate an allocation of the aggregate group communication traffic rate for each communication link based on an attainable communication traffic rate of the communication link.

The communication link bonding manager may also set respective operating communication traffic rates for the communication links according to the communication traffic rate allocation.

Initialization and communication traffic rate allocation operations may be repeated for communication links in each of multiple groups.

A method of allocating communication traffic rates is also provided. Communication links are initialized using respective initialization communication traffic rates, and an allocation of an aggregate group communication traffic rate for each of the communication links is calculated based on an attainable communication traffic rate of the communication link.

In a further broad aspect, the invention provides a communication device which includes a network termination device operatively coupled to a communication network, a plurality of transceivers for transmitting communication traffic on respective sets of at least one communication line, a line termination device, operatively coupled to the network termination device and to at least a subset of the plurality of transceivers, and adapted to transfer communication traffic between the network termination device and the plurality of transceivers, and bonding means for configuring a plurality of the communication lines as a bonding group at the line termination device for providing an aggregate group communication traffic rate.

Other aspects and features of the present invention will become apparent to those ordinarily skilled in the art upon review of the following description of specific illustrative embodiments thereof.

BRIEF DESCRIPTION OF THE DRAWINGS

Examples of embodiments of the invention will now be described in greater detail with reference to the accompanying drawings, in which.

DETAILED DESCRIPTION OF PREFERRED EMBODIMENTS

Figure 1:
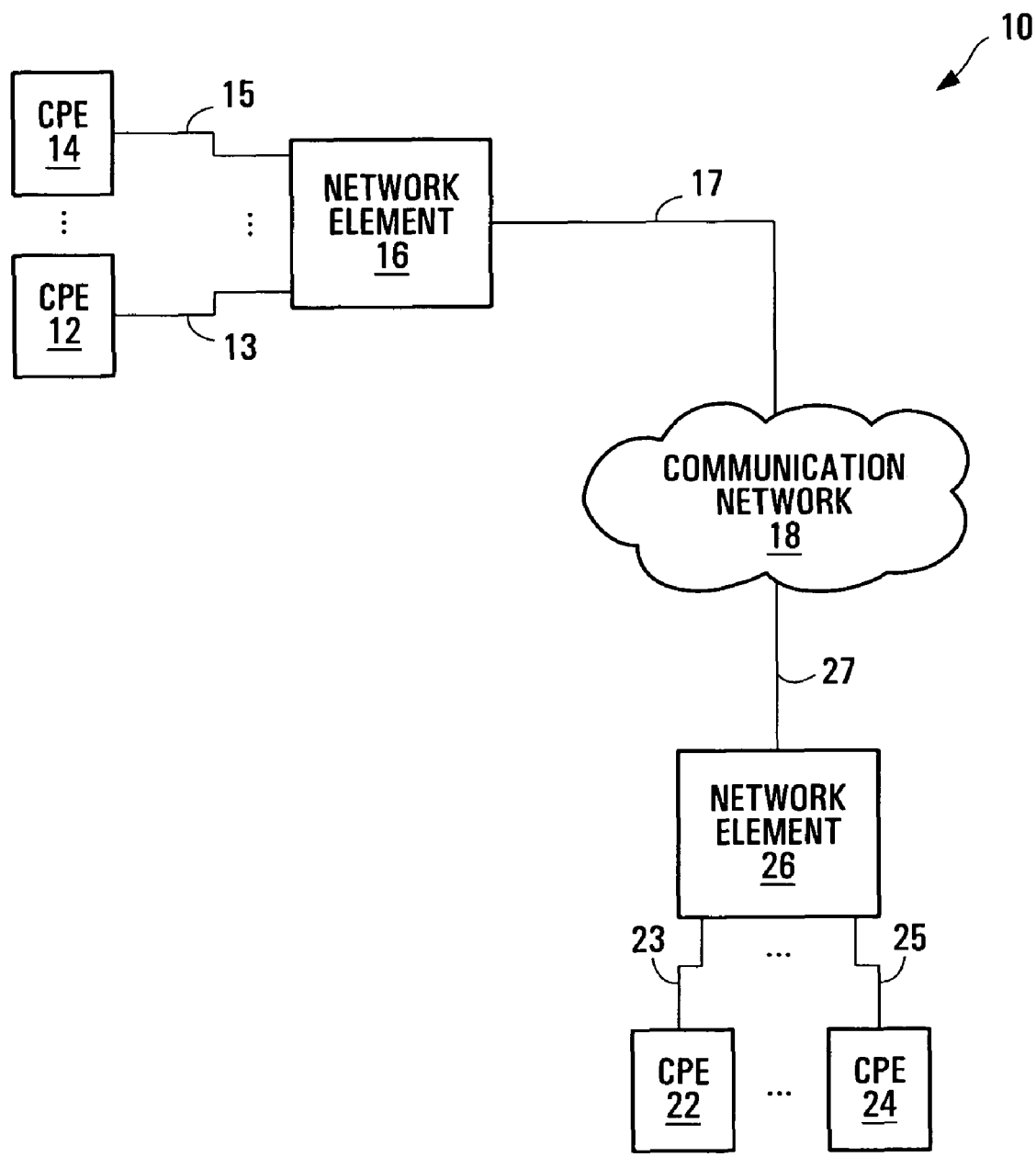
FIG. 1 is a block diagram of a communication system in which embodiments of the invention may be implemented.

FIG. 1 is a block diagram of a communication system in which embodiments of the invention may be implemented. The communication system 10 in FIG. 1 includes CPE terminals 12, 14, 22, 24, network elements 16, 26, and a communication network 18. Although only four CPEs 12, 14, 22, 24 and two network elements 16, 26 have been shown in FIG. 1 to avoid congestion, many more CPEs and network elements may be connected to the communication network 18. It should therefore be appreciated that the system of FIG. 1, as well as the contents of the other drawings, are intended solely for illustrative purposes, and that the present invention is in no way limited to the particular example embodiments explicitly shown in the drawings and described herein.

The CPEs 12, 14, 22, 24 represent communication equipment, illustratively end user communication devices, configured to receive and/or transmit communication traffic. Although shown as being directly connected to the network elements 16, 26, it will be apparent that CPEs 12, 14, 22, 24 may communicate with the network elements 16, 26 through other intermediate components (not shown). In one embodiment, the connections 13, 15, 23, 25 are local twisted pair loops used to establish DSL communication links.

Switches and routers are illustrative of the types of communication equipment represented by the network elements 16, 26. For example, where the connections 13, 15, 23, 25 are DSL connections, the network elements 16, 26 may be DSLAMs or Advanced Services Access Managers (ASAMs) or Intelligent Services Access Managers (ISAMs). The network elements 16, 26 provide access to the communication network 18 for the CPEs 12, 14, 22, 24, and thus may be implemented within the communication network 18. However, the network elements 16, 26 have been shown separately from the communication network 18 in FIG. 1 for illustrative purposes.

The communication network 18, in addition to the network elements 16, 26, may also include intermediate network elements which route communication traffic through the communication network 18. Embodiments of the invention may provide ATM-based bonding of DSL lines, as described briefly above, where the communication network 18 is an ATM network and ATM Virtual Circuits (VCs) are established on the connections 17, 27.

Many different types of end user, intermediate, and network communication equipment, as well as the operation thereof, will be apparent to those skilled in the art. In general, the network elements 16, 26 transfer communication traffic between the communication network 18 and the CPEs 12, 14, 22, 24. In particular example embodiments, the network elements 16, 26 exchange communication traffic over ATM, and use ATM-based bonding to transfer communication traffic with the CPEs 12, 14, 22, 24 over DSL connections. However, as will become apparent from the following description, embodiments of the invention are not limited to any particular types of communication equipment, transfer mechanisms, or protocols. The bonding techniques disclosed herein may be used in conjunction with Ethernet network connections instead of ATM connections, and Ethernet- or packet-based bonding instead of ATM-based bonding, for instance.

Figure 2:
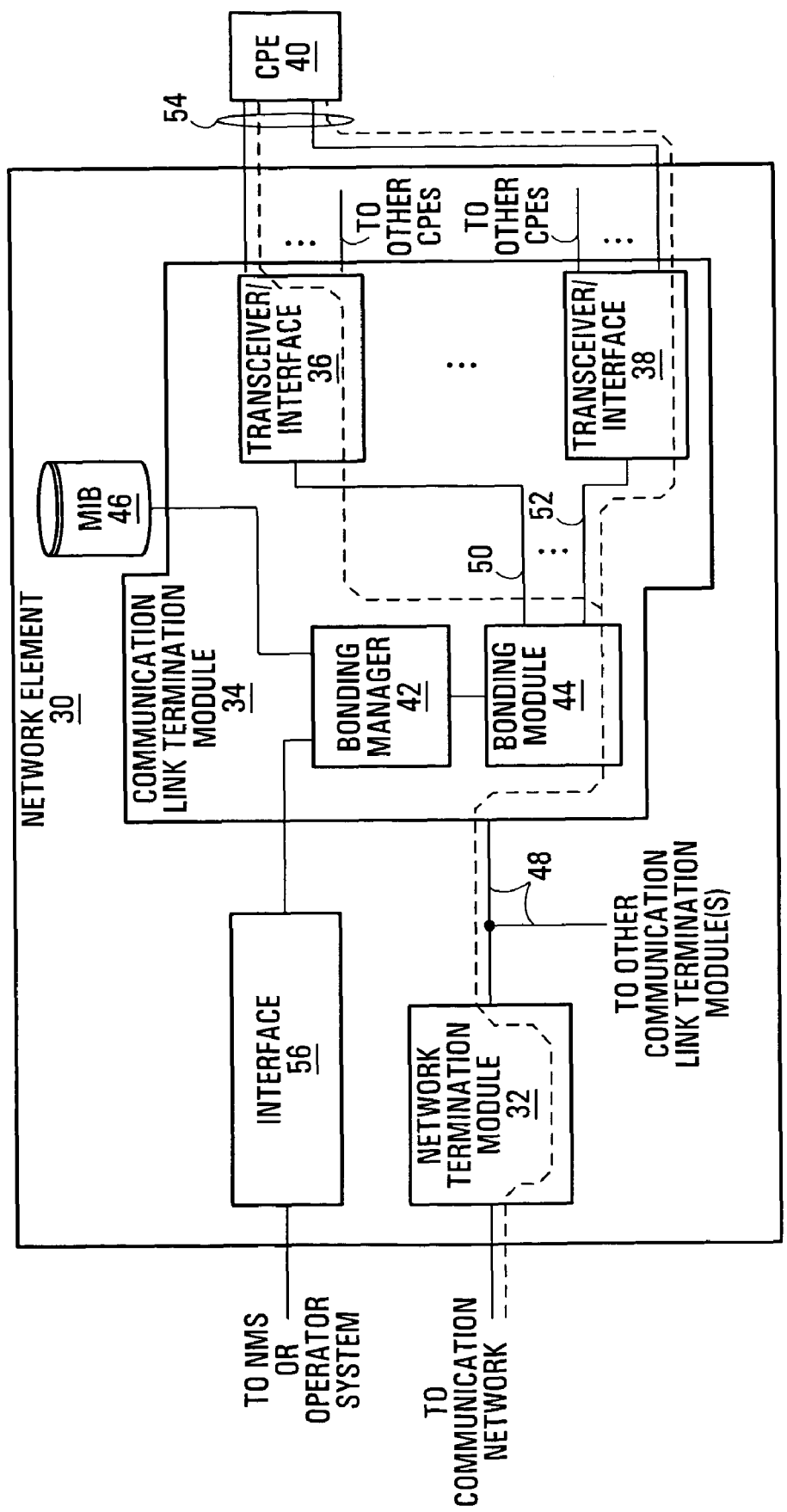
FIG. 2 is a block diagram of a communication device incorporating an embodiment of the invention.

FIG. 2 is a block diagram of a communication device, illustratively a network element 30, incorporating an embodiment of the invention. As shown, the network element 30 includes a network termination module 32 which is operatively coupled to one or more communication link termination modules, one of which is shown at 34, through an internal connections represented at 48. Although referred to herein primarily as an internal bus, the internal connections 48 may instead be implemented using point to point links or other types of connection or link.

The communication link termination module 34 includes a communication link bonding manager 42 and a bonding module 44, which is operatively coupled to transceivers/interfaces 36, 38 through connections 50, 52. Each transceiver/interface 36, 38 represents an interface to a physical communication medium through which communications may be established with the CPE 40 and possibly other CPEs. The interface 56 and the Management Information Base (MIB) 46 are used in some embodiments to configure and manage groups of communication links as described in further detail below.

The network termination module 32 terminates a communication link at a network side of the network element 30. The communication link termination module 34 terminates access-side communication links at the network element 30, and thus processes communication traffic for transfer between access communication links and another (network) communication link.

One common type of physical structure for communication network equipment such as the network element 30 includes an equipment rack having shelves with multiple electronic card slots. The network termination module 32 may then be provided on a shelf as a network termination (NT) card. Multiple NT cards may be installed on a shelf to support redundancy protection. A line termination (LT) card is then used in each of one or more of the remaining slots as the communication link termination module 34, to provide a medium- or protocol-specific interface. In this type of installation, the internal bus 48 is often provided as backplane connections on the equipment rack. Although shown in FIG. 2 as being internal to the communication link termination module 34, the transceivers/interfaces 36, 38 may be external components to which a communication link termination module is connected. Similarly, the MIB 46 may be internal to a communication link termination module.

Details of the structure and operation of various types of network and line termination modules 32, 34, illustratively NT and LT cards, will be apparent to those skilled in the art.

The bonding manager 42 and the bonding module 44 may be implemented, for example, in software for execution by a processor in the network termination module 32 or the communication link termination module 34, in hardware such as a Field Programmable Gate Array (FPGA), or some combination thereof. Distributed architectures are also contemplated. For instance, the bonding manager 42 may be implemented partially in each of the network termination module 32 and the communication link termination module 34.

The bonding module 44 may be provided on a DSL chipset on an LT card to provide for chipset-level bonding. LT-level bonding, to support bonding of communication links supported by multiple chipsets or transceivers/interfaces 36, 38, as shown in FIG. 2, may be provided by implementing the bonding module 44 "upstream" of the transceivers/interfaces 36, 38. In this type of upstream implementation, functionality of the bonding module 44 may be provided in software for execution by a processor of the communication link termination module 34 which also supports a so-called Inter-Working Function (IWF), or in an FPGA which is coupled to the processor, for example.

Each transceiver/interface 36, 38 may include a modem or other type of communication component which is adapted to at least transmit, and preferably to transmit and receive, communication traffic on communication links to CPEs. Each CPE 40 for which the network element 30 provides access to a communication network includes a compatible transceiver/interface. In one embodiment, each LT card in an ASAM includes DSL chipsets which incorporate the transceivers/interfaces 36, 38 as shown. Each chipset may provide multiple interfaces, illustratively 6-12 ports, whereas an LT card supports a total of 12-48 access lines by implementing multiple chipsets.

The MIB 46 represents data which is stored in a memory device, preferably a persistent memory device, in the network element 30. The memory device may be provided in the communication link termination module 34, the network termination module 32, or externally, as shown.

The Simple Network Management Protocol (SNMP), for example, allows a manager to access management information on a managed device, and for the managed device to send managers unsolicited messages such as notifications, typically when important events occur. An SNMP agent runs in a managed device to interact with managers and access management information on the device. Management information is generally any data defined to manage a device. This is often accomplished by writing descriptions of the management information in MIB modules.

A MIB may include the collection of all management information definitions, although there is no clear distinction between the definitions of management information and the values of that management information. Thus, the same term "MIB", in reference to a device, may designate all of the management information stored on a device at any instant in time, as well as the definitions of management information which may be written to or modified on a device to manage device functions.

The above-referenced ITU Recommendation describes an example of one possible MIB for ATM-based bonding of DSL lines.

The interface 56 may thus be an SNMP agent, for example, and provides for communication with a Network Management System (NMS) or operator system for configuration of bonding groups as disclosed herein. Control and management information may be transferred between the network element 30 and the NMS or operator system through the interface 56 via the communication network to which the network termination module 32 is connected, or through dedicated control connections or paths. The interface 56 may also or instead include a local interface to enable control and management functions to be performed using a local terminal during service or maintenance of the network element 30.

Although embodiments of the invention relate to communication link bonding, the interface 56 need not necessarily be dedicated to bonding control and management. The interface 56 may be an existing interface which also provides for other control and management functions.

In accordance with an aspect of the invention, multiple communication links are bonded to form a logical group, as disclosed in further detail herein. The group is configured to have minimum and maximum communication traffic rates, illustratively bit rates, which may be requested by a subscriber for instance. Another aspect of the invention provides an algorithm which is used to automatically allocate the group communication traffic rates to the individual links in the group. As shown in FIG. 2, the bonding module 44 which performs the bonding function is provided at the communication link termination module 34. The bonding function for communication links supported by an LT card, for example, is then local to that LT card.

Transfer of communication traffic over bonded CPE communication links is managed in the network element 30 by the bonding manager 42 and the bonding module 44. The bonding manager 42 is used to configure multiple communication links 54 as a group, at the communication link termination module 34. Bonded or grouped communication links are shown for illustrative purposes as dashed lines spanning access communication lines to the CPE 40 and transceiver connections 50, 52. The grouped communication links together provide an effective aggregate group communication traffic rate on the network communication link to which the network termination module 32 is connected.

Configuration of communication links as a group may involve setting configuration information in a data store, specifically in the MIB 46 in the network element 30. As described above, the interface 56 provides for control and management of the network element 30 from an NMS or operator system. In one embodiment, the bonding manager 42 configures the group by modifying or storing information in the MIB 46 responsive to user inputs received from the NMS or operator system through the interface 56.

The MIB 46 may include, for example, any or all of the parameters of the MIB described in the above-referenced ITU Recommendation in embodiments supporting ATM-based bonding of DSL lines. A MIB for other types of bonding may include substantially similar or different parameters. The invention is not limited to any particular MIB structure, format, or content.

New MIB parameters may be useful in providing LT-level bonding management. For example, the eligibility of a communication link for inclusion in a group may be controlled by a mode parameter, whereby only those communication links having a mode parameter set to "bonding" or a like mode are eligible to be included in a group. A communication link having a mode parameter set to a native or "non-bonding" mode is treated in a conventional manner. Thus, implementation of embodiments of the invention in a network element would not preclude conventional communication traffic processing at the network element, such that the same network element may provide different levels of service to different CPEs. Single or bonded link services may be provided to customers based on bandwidth requirements and the proximity of CPEs to a network element.

A bonding link table or other data structure may also be provided in the MIB 46 to associate a bonded link to a bonding group. In one embodiment, each communication link has an identifier, and the identifier of one communication link in a group is chosen, illustratively by an operator, as a group identifier. A communication link may then be associated with a group by adding the group identifier to a bonding link table entry which corresponds to the communication link. Other possible data structures or tables for mapping or associating links with groups will be apparent to those skilled in the art.

The bonding manager 42 also determines an allocation of the aggregate group communication traffic rate among the communication links in the group. A rate allocation for each communication link may be determined automatically or based on manually entered per-link rates or allocations entered by an operator through the interface 56. In general, automatic rate allocation as described below may be preferred so as to match communication traffic distribution to communication link capacities and avoid manual configuration of customer-specified aggregate group communication traffic rates, for example.

The selection of automatic or manual communication traffic rate allocation is an example of another function which might be controlled using a new MIB parameter, illustratively a rate split mode parameter. The rate split mode parameter could be set to "manual" for a group to allow an operator to manually configured communication traffic rates on bonded communication links to address transient noise issues. The operator may be aware of an intermittent interference source which affects a communication link in a bonding group, for instance. In this case, the operator may wish to manually configure communication traffic rates for the communication links in the group, bypassing the automatic rate splitting function. Thus, a rate splitting mode may be selected on a per-group basis, such that rates for all links of a bonding group are manually configured if at least one communication link in the group is to be manually configured, or rates for all links of a bonding group are automatically allocated.

Automatic communication rate allocation may involve determining respective attainable communication traffic rates of the communication links in a group. A communication traffic rate allocation may then be calculated for each communication link based on the attainable communication traffic rate of that link relative to the total of the attainable communication traffic rates of all of the communication links in the group. One example of an automatic allocation technique is described in further detail below, with reference to FIG. 3.

The bonding module 44 is operatively coupled to, and preferably incorporated into, the communication link termination module 34, and distributes communication traffic received on the network communication link for transmission on the bonded communication links 54 in accordance with the communication traffic rate allocation determined by the bonding manager 42. In the other direction, communication traffic received from the CPE 40 over the bonded links 54 is merged by the bonding module 44 into an aggregate traffic flow.

Operation of the bonding module 44 is now described in further detail in the context of ATM-based bonding. It should be appreciated, however, that ATM-based bonding is intended solely for illustrative purposes, and not to limit the scope of the invention. Other types of transmission data unit than ATM cells may be used to transfer communication traffic over bonded communication links in other embodiments of the invention.

Considering first the "downstream" direction, from the network element 30 to the CPE 40, communication traffic received from the communication network and destined for the CPE 40 is forwarded by the network termination module 32 to the communication link termination module 34 on the internal bus 48. The received communication traffic is formatted into ATM cells, if necessary, by functional components (not shown) such as an IWF of the communication link termination module 34. ATM cell formatting supports transfer of non-ATM communication traffic via ATM-based bonded communication links. In one embodiment, an Ethernet-based backplane is provided in the network element 30, and received Ethernet frames are re-formatted into ATM cells by the communication link termination module 34.

The ATM cells are then output to the bonding module 44, by a master scheduler of the communication link termination module 34 for instance. The bonding module 44 inserts a sequence identifier (SID) into each ATM cell, illustratively into the cell header. According to the above ITU Recommendation, the SID is inserted into the Virtual Channel Identifier (VCI) and/or the Virtual Path Identifier (VPI) portions of ATM cell headers, depending on whether 8- or 12-bit SIDs are used. The SID indicates a correct ordering of the ATM cells, to allow a corresponding bonding module at the CPE 40 to properly assemble the transmitted cells to recover an original communication traffic stream. As those skilled in the art will appreciate, different communication links may experience different delays during transmission to the CPE 40, and accordingly cells might not arrive at the CPE 40 in the same order in which they were transmitted from the network element 30.

ATM cells are distributed by the bonding module 44 among the bonded communication links 54, by storing the cells in per-link queues of the transceivers/interfaces 36, 38 for instance, and then scheduled out of the queues to a physical communication line. A master scheduler of the communication link termination module 34 is re-used for this purpose in some embodiments.

Communication link bonding at the communication link termination module 34 may also provide for flow control of downstream communication traffic based on hardware backpressure signals from the physical communication lines, transmit queues, or both.

Those skilled in the art will be familiar with further operations which might be performed at the network termination module 32 and at the communication link termination module 34 for bonded and native communication traffic. Although functional blocks associated with these operations have not been explicitly shown in the drawings, it is to be understood that implementation of embodiments of the invention do not preclude processing of non-bonding traffic according to conventional techniques, and the application of at least some of these techniques, such as backpressuring and scheduling for instance, to bonding traffic as well.

In the upstream direction, the bonding module 44 receives ATM cells from the CPE 40 through the transceivers/interfaces 36, 38. SIDs inserted into the ATM cells by a bonding module at the CPE 40 allows the bonding module 44 to merge the received cells, in their correct sequence, into an aggregate communication traffic stream for transfer to other functional components of the communication link termination module 34, such as an IWF. The aggregate traffic stream may be re-formatted, into Ethernet frames for instance, and transferred to the network termination module 32 for transmission through the communication network.

As described above, ATM cells transmitted over multiple communication links might not arrive at a destination in the order in which they were transmitted. The bonding module 44 thus preferably buffers ATM cells received from the CPE 40. Received cells may be queued on a per-bonded link basis and grouped on a per-bonding group basis for re-ordering, for example. In this case, all queues in a group share the buffer pool of the group. Alternatively, received cells may be queued in a per-group queue. Each received cell is put in the appropriate position of the queue, based on its SID which may also be used to index the queue. Once the cell at the head of the queue is retrieved from the queue, the whole queue is shifted by one cell position.

With per-link receive queuing, the bonding module 44 may determine a next expected SID based on the SID in one or more queued cells. When all queues are non-empty or at least one queue has been empty for at least the maximum differential delay, which is the maximum transmission delay between communication links of a bonding group, a current SID is initialized to the smallest SID at the head of the per-link queues. Since SIDs are sequentially assigned and wrap around once a predetermined maximum SID, maxSID, has been reached, SID wraparound is preferably detected by the bonding module 44. To this end, in one embodiment, an SID x is determined to be less than another SID y if $$x < y < x + \frac{\text{max}SID + 1}{2}.$$

The next expected SID is then calculated as the current SID plus one. A cell having the next expected SID is then retrieved from a per-link queue, if it has been received, and output from the bonding module 44. If the smallest SID at the head of the per-link queues is larger than the next expected SID but all queues are non-empty, then the cell having the smallest SID is retrieved from the per-link queue and output from the bonding module 44. The next expected SID is set to the SID of the last output cell plus one. If the smallest SID at the head of the per-link queues is larger than the next expected SID but at least one queue is empty, the bonding module waits for up to a predetermined amount time, illustratively the maximum differential delay, or until the buffering threshold of the group is reached. Then the smallest SID at the head of the queues is considered the next expected SID. A cell having the next expected SID is retrieved from the queue and output from the bonding module 44.

In the case of per-group queue, a cell is retrieved once it reaches the head of the queue. An empty cell position at the head of the queue is released, i.e., the whole queue is shifted by a cell position, if the cell position at the head of queue has been empty for a predetermined amount of time, such as the maximum differential delay as described above, or the queue threshold is reached.

The bonding module 44 preferably waits up to a predetermined amount of time to receive each expected SID. After a next expected SID is calculated, if at least one queue has been empty for the maximum differential delay, then the smallest SID currently at the head of the queues is then considered the next expected SID. Any cells which then arrive with a smaller SID are discarded, as they have already been considered lost. In this embodiment, the bonding module 44 waits the maximum differential delay before declaring a cell lost. A buffered block of cells may be output from the bonding module 44 or discarded in the event of a cell being declared lost. Other error processing operations which may be performed responsive to cell loss will be apparent to those skilled in the art.

As described briefly above, communication traffic rate allocations for a bonding group may be either manually configured, using predetermined per-link communication rates, or automatically determined by the bonding manager 42. In the case of manual configuration, each communication link to be included in a bonding group is initialized with a corresponding per-link communication traffic rate. Provided all of the links of the group initialize, which for DSL connections is generally termed reaching "showtime", or the per-link communication traffic rates on initialized links are sufficient for a planned aggregate group communication traffic rate, then the group becomes operational. Otherwise, if not all links initialize and/or the total of all communication traffic rates of initialized links is below the planned aggregate group rate, alarms may be raised and appropriate actions taken, such as to provision additional communication links for the group.

Figure 3:
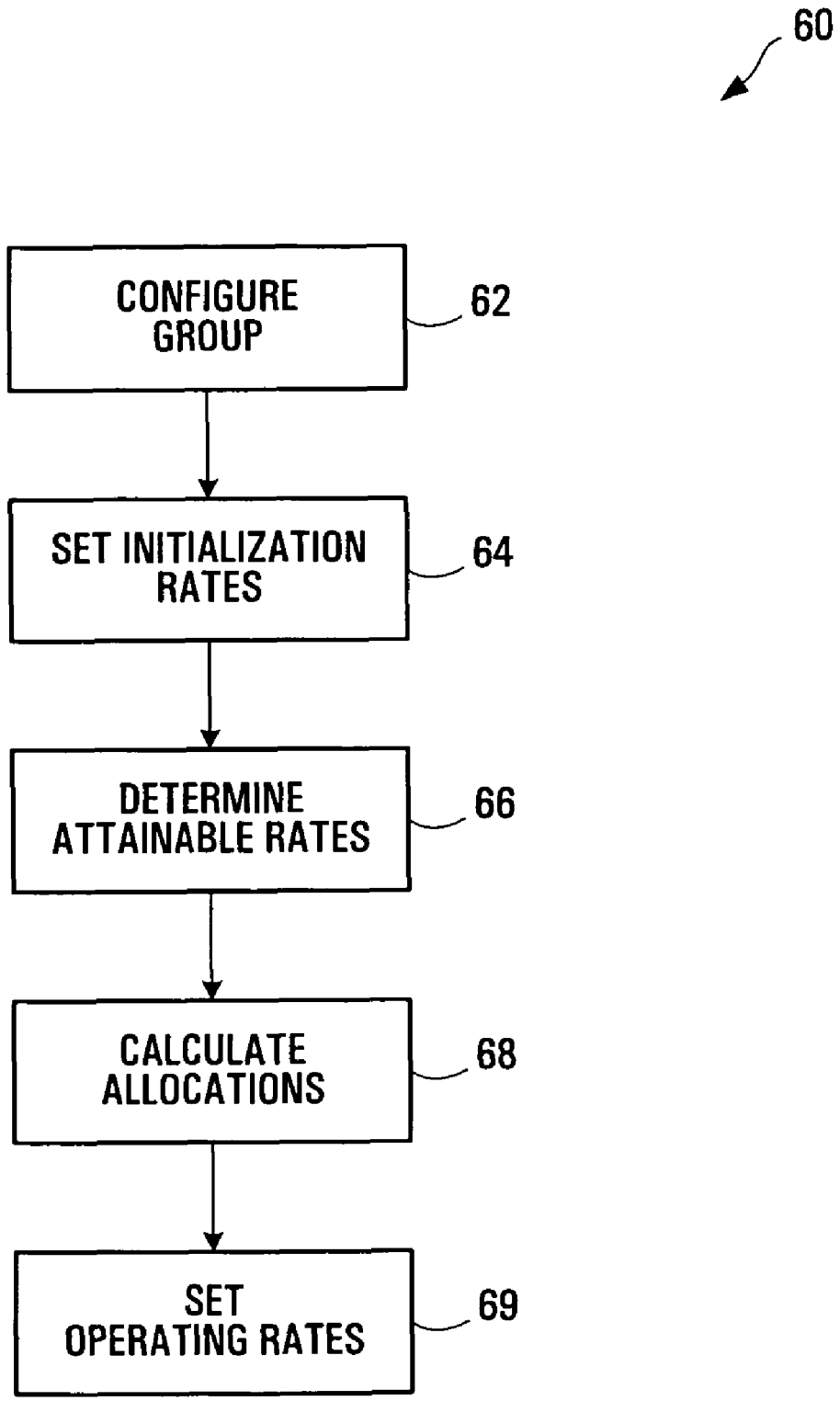
FIG. 3 is a flow diagram of a method according to an embodiment of the invention.

A further aspect of the invention relates to allocation of communication traffic rates to a group of communication links by the bonding manager 42. FIG. 3 is a flow diagram of a method of allocating communication traffic rates according to an embodiment of the invention.

The method 60 begins at 62 with a step of configuring communication links to form a group for providing an aggregate group communication traffic rate. At 64, respective communication traffic rates are set for initializing the communication links. Attainable communication traffic rates of initialized communication links are then determined at 66. A communication traffic rate allocation for each communication link is calculated at 68 based on the attainable communication traffic rate of the communication link, and operating rates for the links are set accordingly at 69.

An illustrative example of the method 60 will now be described for the general case of N communication links in a bonding group for which a minimum aggregate group communication traffic rate $MIN_G$ and a maximum communication traffic rate $MAX_G$ are specified or requested by a customer. The customer may also specify the number of communication links, and possibly particular links, to be included in the group.

According to one embodiment of the invention, minimum and maximum communication rates $MIN_i=0$ and $MAX_i=MAX_G$ (i=1 to N) are set for each of the N communication links at 64. As each communication link is initialized by establishing communications on the link, an attainable communication traffic rate of the link may be determined.

The operations at 64 and 66 may involve interaction between the bonding manager 44 (FIG. 2) and an access communication link manager such as a DSL manager or DSL modems in a DSL chipset. For example, the bonding manager 44 may send configuration information for the initialization communication traffic rates to a DSL manager and retrieve per-link operational data, including attainable rate, from the DSL chipset via the DSL manager once each DSL connection reaches showtime (or fails to initialize). The particular implementation details for attainable rate determination may vary between communication link termination modules, LT cards, and types of communication link.

The above communication link initialization operations may be considered a first stage or phase of communication traffic rate allocation. A second stage of rate allocation proceeds after link initialization and attainable rate determination. In the case of DSL links, the second stage of rate allocation is performed after the links reach showtime and attainable rates have been determined.

In the second stage, communication traffic rate allocations are calculated at 68, based on a communication traffic rate splitting ratio $$X_i = \frac{ATT_i}{\sum_{1}^{N} ATT_n},$$

where $ATT_i$ is the attainable communication traffic rate of the $i^{th}$ communication link, for example.

As noted above for manual rate allocation, various alarms may be raised in the event of communication link initialization failures or if the sum of attainable rates on initialized lines is less than the minimum aggregate group communication traffic rate, $MIN_G$.

A bonding group becomes operational after the bonded communication links reach showtime, or more generally, after the links are initialized. In one embodiment, operating communication rates which are set for each communication link at 69 depend on a rate adaptation mode of the communication links. A minimum communication traffic rate, or both minimum and maximum communication traffic rates, may be set as $MIN_i=X_i \times MIN_G$, or $MIN_i=X_i \times MIN_G$ and $MAX_i=X_i \times MAX_G$. These operating settings, like the initialization settings described above, may be configured by a bonding manager through interaction with a DSL manager for example.

The communication link bonding techniques disclosed herein provide for bonding of communication lines close to physical interfaces of the a line termination module, which reduces the impact of bonding on existing functionalities of communication equipment. Functions or applications such as Interim Local Management Interface (ILMI), which are terminated at LT cards, for example, are not affected by LT-level communication link bonding. Similarly, functions and applications which are implemented upstream of a bonding function, multicasting for instance, also remain intact.

Embodiments of the invention are also relatively easily implemented with limited impact on processor load and existing functions and applications.

Communication link bonding as disclosed herein may have particular commercial value in that it addresses an important area of communication services such as DSL services, namely increasing DSL service rate and reach. This is important to provide higher access link bandwidth to existing subscribers, and hence the potential for higher service revenues through enhanced multi-tier pricing, and to reach hitherto unreachable areas to expand the subscriber base.

What has been described is merely illustrative of the application of principles of the invention. Other arrangements and methods can be implemented by those skilled in the art without departing from the scope of the present invention.

For example, FIGS. 1 and 2 include references to a communication network and a network termination module. The present invention may, however, be implemented in conjunction with other types of communication link, which need not necessarily traverse a network.

The present invention is also not restricted to any particular transfer mechanisms or physical media, and may be used with wired or wireless communication links for instance.

ATM-based bonding is also intended solely for illustrative purposes. The techniques disclosed herein may be applied to Ethernet- and packet-based bonding, for instance, in which Ethernet frames and packets, respectively, are used as transmission data units for communications with CPEs.

References herein to communication links should also be interpreted broadly, to include physical media such as DSL lines or logical connections such as communication channels. A single physical bearer may include multiple channels, for example, which may be separately bonded into different groups.

The foregoing description concentrates primarily on service provider communication equipment, illustratively an ASAM. CPEs may operate in a substantially similar manner, although implementation of embodiments of the invention at service provider equipment does not require that the same communication traffic rate allocation techniques, for instance, be applied at a CPE for upstream communications.

It should also be appreciated that multiple bonding groups may be configured at communication equipment in accordance with embodiments of the invention.

In addition, although described primarily in the context of methods and systems, other implementations of embodiments of the invention are also contemplated, as instructions stored on a machine-readable medium for example.

We claim:

1. A digital subscriber line access multiplexer (DSLAM) comprising:
   a network termination device operatively coupled to a communication network through a network communication link;
   a plurality of transceivers for transmitting communication traffic on respective sets of at least one access communication link, each access communication link comprising a Digital Subscriber Line (DSL) communication link; and
   a plurality of line termination devices, operatively coupled to the network termination device and to respective subsets of the plurality of transceivers,
   each line termination device comprising a respective apparatus for managing transfer of communication traffic between the network termination device and the respective subset of the plurality of transceivers, the apparatus of each line termination device comprising:
      a communication link bonding manager implemented in a processor adapted to configure a plurality of the access communication links of the transceivers to which the line termination device is operatively coupled, as an access group for providing a respective aggregate group communication traffic rate on the network communication link, and to allocate the aggregate group communication traffic rate among the plurality of access communication links; and a bonding module implemented in a processor adapted to distribute the communication traffic received on the network communication link for transmission on the plurality of access communication links in accordance with the allocation of the respective aggregate group communication traffic rate; and an interface for receiving user inputs including a mode parameter specifying eligibility of the communication link for inclusion in the access group, a Management Information Base (MIB) comprising a bonding link table comprising an array of table entries for each access communication link modified by the communication link bonding manager, each table entry of the array of table entries including an identifier for the access communication link, wherein one access communication link identifier from the access group is chosen as a group identifier and access communication links associate with the access group by adding the group identifier to the respective table entry, wherein the communication link bonding manager of at least one of the line termination devices configures the access group by storing information in the Management Information Base (MIB) responsive to the user inputs.

2. The DSLAM of claim 1, wherein the communication link bonding manager of at least one of the line termination devices is adapted to allocate the respective aggregate group communication traffic rate by determining respective attainable communication traffic rates of the plurality of access communication links and calculating the communication traffic rate allocation for each of the plurality of access communication links based on the attainable communication traffic rate of the access communication link.

3. The DSLAM of claim 1, wherein the bonding module of at least one of the line termination devices is adapted to distribute the communication traffic in a sequence of transmission data units for transmission on the plurality of access communication links, and is further adapted to include in each of the transmission data units a sequence identifier indicating a position of the transmission data unit in the sequence of transmission data units.

4. The DSLAM of claim 1, wherein the bonding module of at least one of the line termination devices is further adapted to receive communication traffic from the plurality of access communication links in transmission data units comprising respective sequence identifiers indicating a sequence of the transmission data units, and to merge the received transmission data units in the sequence indicated by the sequence identifiers into an aggregate communication traffic stream for transfer to the network termination device.

5. The DSLAM of claim 4, wherein the bonding module of the at least one of the line termination devices is configured to merge the received transmission data units by determining expected sequence identifiers, storing transmission data units having the expected sequence identifiers received within a predetermined period of time, and declaring as missing any transmission data units having the expected sequence identifiers which are not received within the predetermined period of time.

6. The DSLAM of claim 1, wherein the network communication link is an Asynchronous Transfer Mode (ATM) communication link or an Ethernet communication link.

7. The DSLAM of claim 1, wherein the MIB further comprises a rate split mode parameter indicating whether allocation of the aggregate group communication rate is to be performed by the bonding manager automatically or responsive to the user inputs.

8. The DSLAM of claim 1, wherein the communication link bonding manager of at least one of the line termination devices is adapted to initialize the plurality of access communication links using respective initialization communication traffic rates, and to calculate an allocation of the respective aggregate group communication traffic rate for each of the plurality of access communication links based on an attainable communication traffic rate of the access communication link.

9. The DSLAM of claim 8, wherein:
the plurality of access communication links comprises N access communication links;
the communication link bonding manager of the at least one of the line termination devices is adapted to set as the initialization communication traffic rates a minimum communication traffic rate $MIN_i$ and a maximum communication traffic rate $MAX_i$ for each of the N access communication links:
$MIN_i=0$
$MAX_i=MAX_G$, where i=1 to N, and
$MAX_G$ is a maximum respective aggregate group communication traffic rate; and
the communication link bonding manager of the at least one of the line termination devices is adapted to calculate the communication traffic rate allocation for each of the plurality of access communication links based on a communication traffic rate splitting ratio $X_i$, where $X_i = ATT_i/\text{sum}(1,N)*ATT_n$, and $ATT_i$ is the attainable communication traffic rate of the $i^{th}$ access communication link.

10. The DSLAM of claim 9, wherein the communication link bonding manager of the least one of the line termination devices is further adapted to set respective operating communication traffic rates for the plurality of access communication links, the respective operating communication rates comprising either:
$MIN_i=X_i*MIN_G$, where
$MIN_G$ is a minimum respective aggregate group communication traffic rate, or
$MIN_i=X_i*MIN_G$ and $MAX_i=X_i*MAX_G$.

11. The DSLAM of claim 8, wherein the communication link bonding manager of the at least one of the line termination devices is further adapted to initialize and to calculate communication traffic rate allocations for access communication links in each of a plurality of access groups of the plurality of access communication links of the transceivers to which at least one of the line termination devices is operatively coupled.

12. A method comprising:
providing a network termination device on a digital subscriber line access multiplexer (DSLAM) operatively coupled to a communication network through a network communication link, a plurality of transceivers located on the DSLAM for transmitting communication traffic on respective sets of at least one access communication link, and a plurality of line termination devices located on the DSLAM, operatively coupled to the network termination device and to respective subsets of the plurality of transceivers, each access communication link comprising a Digital Subscriber Line (DSL) communication link; and allocating, at each line termination device, communication traffic rates to each of an access group of access communication links of the transceivers to which the line termination device is operatively coupled, for providing a respective bonded group communication traffic rate by:
   initializing, by a bonding manager at the line termination device, the access communication links of the access group using respective initialization communication traffic rates;
   configuring, by said bonding manager, the access group using a mode parameter specifying eligibility of the access communications links for inclusion in the access group,
   storing, by said bonding manager, information in a Management Information Base (MIB) responsive to user inputs, said MIB comprising a bonding link table comprising an array of table entries for each communication link modified by the bonding manager, each table entry of the array of table entries including an identifier for the communication link, wherein one communication link identifier from the access group is chosen as a group identifier and communication links associate with the access group by adding the group identifier to the respective table entry; and
   calculating, by said bonding manager, an allocation of the respective aggregate group communication traffic rate for each of the plurality of access communication links based on an attainable communication traffic rate of the access communication link.

13. The method of claim 12, wherein:
the plurality of access communication links comprises N access communication links;
initializing comprises setting as the initialization communication traffic rates a minimum communication traffic rate $MIN_i$ and a maximum communication traffic rate $MAX_i$ for each of the N access communication links:
$MIN_i=0$
$MAX_i=MAX_G$, where
i=1 to N, and
$MAX_G$ is a maximum aggregated group communication traffic rate;
calculating comprises calculating a communication traffic rate splitting ratio $X_i$, where $X_i=ATT_i/\text{sum}(1,N)*ATT_i$, and $ATT_i$ is the attainable communication traffic rate of the $i^{th}$ access communication link.

14. The method of claim 13, further comprising:
setting respective operating communication traffic rates for the plurality of access communication links, the respective operating communication rates comprising either:
$MIN_i=X_i*MIN_G$, where
$MIN_G$ is a minimum aggregated group communication traffic rate, or
$MIN_1=X_i*MIN_G$ and $MAX_i=X_i*MAX_G$.

15. The method of claim 12, wherein said allocating further comprises:
   determining respective attainable communication traffic rates of the plurality of access communication links; and
   calculating the communication traffic rate allocation for each of the plurality of access communication links based on the attainable communication traffic rate of the access communication link.

16. The method of claim 12, wherein the MIB further comprises a rate split mode parameter indicating whether allocation of the aggregate group communication rate is to be performed by the bonding manager automatically or responsive to the user inputs.

17. A tangible machine-readable medium storing instructions which when executed by a computer, perform the method of claim 12.

* * * * *